United States Patent [19]

Whiting

[11] 4,306,756
[45] Dec. 22, 1981

[54] ROLLER ASSEMBLY

[75] Inventor: Lauren C. Whiting, Clarence, N.Y.

[73] Assignee: Whiting Roll-Up Door Mfg. Corp., Akron, N.Y.

[21] Appl. No.: 139,425

[22] Filed: Apr. 11, 1980

[51] Int. Cl.³ .............................................. F16C 33/00
[52] U.S. Cl. ....................................... 308/190; 16/98; 16/107; 308/6 R
[58] Field of Search ................ 301/5.7; 308/6 R, 190, 308/188, 3.8; 16/98, 106, 107

[56] References Cited

U.S. PATENT DOCUMENTS

| | | | |
|---|---|---|---|
| 880,921 | 3/1908 | Rosenberg | 301/5.7 |
| 1,177,046 | 3/1916 | Nice | 308/190 |
| 1,429,158 | 9/1922 | Morton | 301/5.7 |
| 1,936,902 | 11/1933 | Fleming | 16/98 |
| 2,266,042 | 12/1941 | Hufferd et al. | 301/5.7 X |
| 2,467,437 | 4/1949 | Martinec | 301/5.7 |
| 2,717,808 | 9/1955 | Owsen et al. | 301/5.7 |

*Primary Examiner*—Harry N. Haroian
*Attorney, Agent, or Firm*—Sommer & Sommer

[57] ABSTRACT

An improved roller assembly is adapted for use with an upwardly-acting door structure. The improved roller assembly includes an inner ring mounted on a shaft, a sectional outer ring arranged to form an outer race for capturing ball bearings between the rings, and an outer cup-shaped member roll formed to hold the assembly together and to provide an outermost tire adapted to be moved along a track.

6 Claims, 5 Drawing Figures

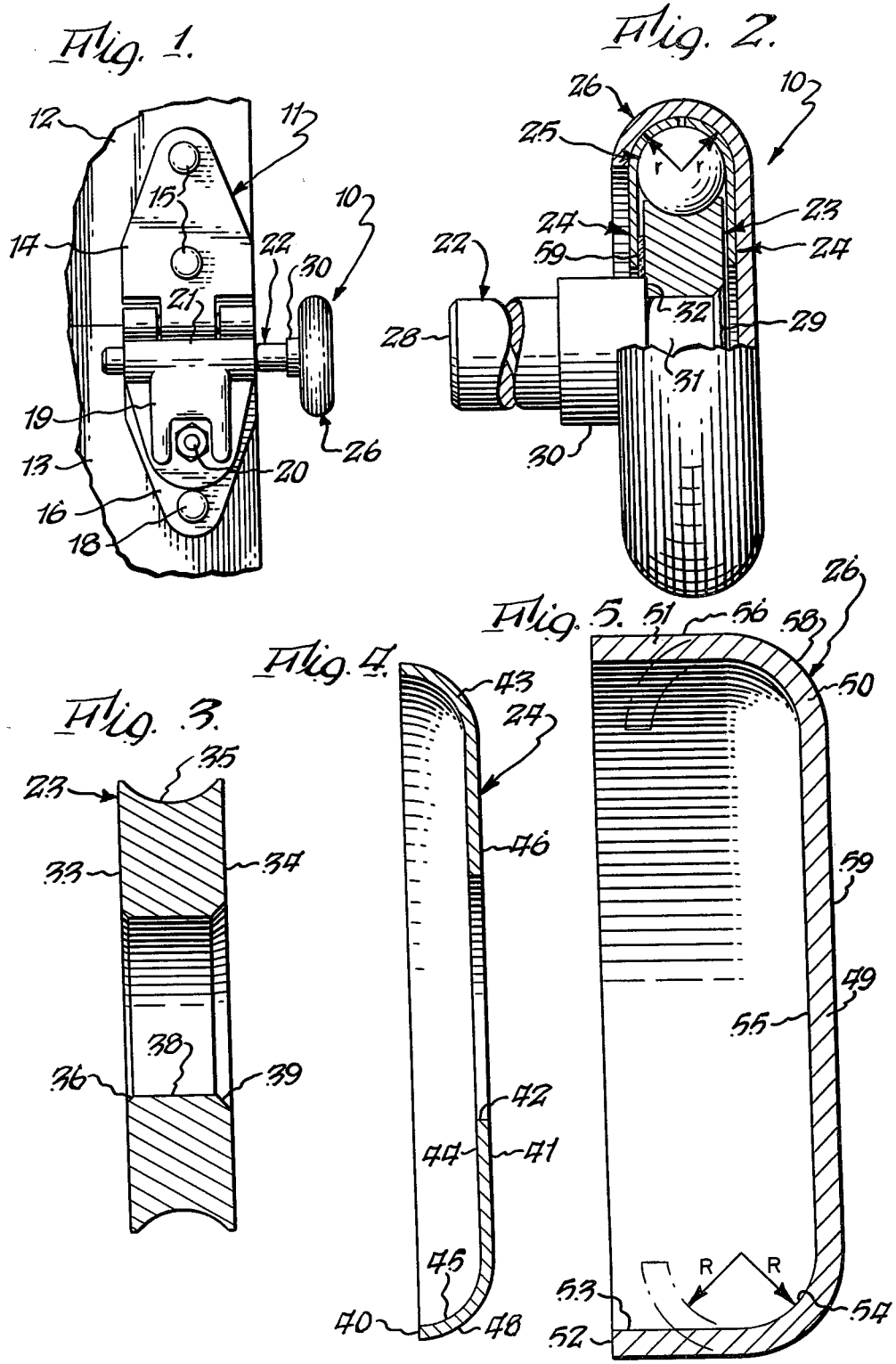

ROLLER ASSEMBLY

BACKGROUND OF THE INVENTION

1. Field of the Invention

The present invention relates generally to roller members, and more particularly to an improved roller member for use in an upwardly-acting door structure.

2. Description of the Prior Art

Rollers and roller members are used in many different applications. For example, such rollers are used to guide movement of an upwardly-acting door structure along a track. Variations of such rollers are also utilized in roller conveyors.

The design of such roller members depends largely upon the service loading encountered. For example, the rollers in a roller conveyor are designed to withstand radial loads, but are not expected to encounter substantial thrust loads. On the other hand, some upwardly-acting doors, such as the roll-up door on the back of a truck, may have to be designed to resist thrust as well as radial loads.

Examples of prior art rollers and roller members may be found in one or more of the following U.S. Pat. Nos.: 3,416,589; 4,017,128; 4,120,543; 4,145,093; 3,994,544; 3,885,840; 3,230,022; and 887,265.

SUMMARY OF THE INVENTION

The present invention provides an improved roller assembly which is particularly suited for use in an upwardly-acting door structure.

The improved roller assembly broadly includes: a shaft having a shoulder arranged proximate one end thereof, the end and shoulder defining therebetween a marginal end portion of said shaft; an inner ring mounted on the shaft marginal end portion and having a surface configured to define an inner race; an outer ring formed by a plurality of sections, the sections having cooperative surfaces configured to provide or simulate an outer race arranged to face the inner race; a plurality of spherical balls operatively arranged between the inner and outer races; and a cup-shaped member having a circular portion arranged in a plane substantially perpendicular to the axis of the shaft, and having a peripheral skirt portion arranged, as by roll forming, to embrace the outer ring sections in area contact to prevent the assembly thus formed from separating and to provide an outermost tire.

Accordingly, the principal object of the present invention is to provide an improved roller assembly.

Another object is to provide an improved roller assembly which is designed to resist a unidirectional thrust load, as well as a radial load.

Another object is to provide an improved roller assembly which is particularly adapted for use in an upwardly-acting door structure.

Another object is to provide an improved roller assembly in which an outermost cup-shaped member is deformed, as by roll forming or the like, to hold the assembly together and to create an outermost tire.

These and other like objects and advantages will become apparent from the foregoing and ongoing written specification, the drawings, and the appended claims.

BRIEF DESCRIPTION OF THE DRAWINGS

FIG. 1 is a fragmentary view of the improved roller assembly mounted on a hinge pivotally joining two panels of an upwardly-acting door structure.

FIG. 2 is an enlarged fragmentary view, partly in section and partly in elevation, of the roller assembly shown in FIG. 1.

FIG. 3 is a further enlarged vertical sectional view of the inner ring shown in FIG. 2.

FIG. 4 is a further enlarged vertical sectional view of the right outer ring section shown in FIG. 2.

FIG. 5 is a further enlarged vertical sectional view of the cup-shaped member shown in FIG. 2 prior to deformation, and showing in phantom the degree of deformation of the depending skirt after roll forming.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIG. 1 thereof, the invention broadly provides an improved roller assembly, of which the presently preferred embodiment is generally indicated at 10, which is particularly useful, inter alia, in mounting an upwardly-acting door (not shown) for movement along a track (not shown). Examples of such upwardly-acting doors include, but are not limited to, garage doors, roll-up truck doors, and the like.

In FIG. 1, the improved roller assembly 10 is shown as being operatively mounted on a hinge 11 pivotally joining an upper door panel 12 and a lower door panel 13. This hinge 11 is of the general type disclosed in U.S. Pat. No. 3,416,589, the aggregate disclosure of which is hereby incorporated by reference. Hinge 11 forms no part of the improved roller assembly claimed herein, and is illustrated only to show one possible environment of use for such improved roller assembly. Hence, suffice it to say here that hinge 11 has an upper leaf 14 secured to the upper door panel 12 by means of rivets 15, 15; has a lower leaf 16 secured to the lower door panel 13 by means of a rivet 18; and has a separable plate-like member 19 mounted on the lower leaf by means of a bolt 20. This member 19 has upper knuckle 21 forming a horizontally-elongated tube in which the shaft of the improved roller assembly may be mounted.

Referring now in particular to FIG. 2, the improved roller assembly 10 broadly includes a shaft 22; an inner ring 23; an outer ring formed by two cooperative sections 24, 24; a plurality of balls 25; and a cup-shaped member 26 rolled to form an outermost tire for the assembly.

As best shown in FIGS. 1 and 2, the shaft 22 is a horizontally-elongated cylindrical member having a vertical left end face 28, a vertical right end face 29, and an annular collar 30 arranged proximate the right end face of the shaft. A marginal end portion 31 of the shaft is defined between the rightwardly-facing annular vertical shoulder 32 of roller 30 and the shaft right end face 29. In the preferred embodiment, shaft 22 is formed of steel, and is either cadmium or zinc plated, although this may be varied as desired.

Referring now to FIG. 3, the inner ring 23 is shown as being a ring-like member having an annular vertical left face 33; and annular vertical right face 34; an outer concave surface 35 providing an inner race for balls 25; and an axial throughbore defined by, from left to right in FIG. 3, a rightwardly-convergent frusto-conical chamfered surface 36 extending rightwardly from left face 33, an intermediate cylindrical surface 38, and a rightwardly-divergent frusto-conical chamfered surface 39 continuing rightwardly therefrom to join right face 34. The inner ring is preferably formed of steel, and is suitably case hardened.

Adverting now to FIG. 2, the outer ring is shown as being formed by two sections 24, 24, arranged so as to face one another. These two sections are structurally identical, and are arranged so that the left is a mirror image of the right. As best shown in FIG. 4, each section is a thin-walled member shaped somewhat like a Belleville spring or washer. The section shown in FIG. 4 has an annular vertical left end face 40, an annular vertical right end face 41 provided with an axial through-opening 42, and an intermediate portion 43 in substantially quarter-round smooth continuous arcuate transistion. The section 24 has a leftwardly-facing annular vertical surface 44 and a rounded concave surface 45 continuing outwardly therefrom to join left end face 40. Conversely, section 24 also has a rightwardly-facing annular vertical surface 46 and a rounded convex surface 48 continuing outwardly therefrom to join left end face 40. Inasmuch as the left section is a mirror image of the right, it is unnecessary to explicitly describe the left section. As best shown in FIG. 2, these two sections 24, 24 are cooperatively arranged such that section surfaces 45, 45 will provide or simulate an outer race for balls 25.

Referring now to FIGS. 2 and 5, the improved roller assembly also includes a cup-shaped member 26, which is deformed to hold the assembly together and to provide a tire adapted to be moved along the track. Member 26 is shown as having a central vertical circular portion 49, a quarter-round arcuate transistional portion 50, and a cylindrical skirt portion 51 continuing leftwardly therefrom. Hence, the cup-shaped member has an annular vertical left face 52; an inner surface including, from left to right in FIG. 5, an inner cylindrical surface 53, a substantially quarter-round concave transitional surface 54, and a leftwardly-facing circular vertical surface 55; and an outer surface including, from left to right in FIG. 5, an outer cylindrical surface 56, a substantially quarter-round convex transitional surface 58, and a rightwardly-facing vertical cylindrical surface 59.

After the cup-shaped member has been slipped over the outer ring sections (FIG. 2), the end face 52 of the depending skirt 51 is roll formed inwardly through an arc of about ninety degrees, this deformed position being shown in phantom in FIG. 5. Such rolled deformation of the skirt has two functions. First, it holds the roller assembly together; and, secondly, it forms an outermost tire adapted to be moved along a track (not shown). As best shown in FIG. 2, the deformed cup-shaped member engages the outer ring sections in substantial area contact, the frictional engagement therebetween causing the tire and the outer ring sections to move together as a subassembly. The right end face 29 of the shaft is swaged into frictional engagement with the inner ring, so that the shaft and inner ring are constrained to move together as a subassembly. Because the left face 33 of the inner ring 23 engages the shaft shoulder surface 32, the roller assembly is particularly adapted to resist a unidirectional thrust load applied in a direction facing the shoulder, this being from right to left in FIG. 2, as well as a radial load.

If desired, an annular flat washer seal member 59, formed of felt or equivalent, may be operatively positioned to slidably or wipingly engage proximate portions of the outer ring section, the shaft, and the inner ring. The purpose of this seal member is to prevent or inhibit dirt and other contaminants from entering the roller assembly. Of course, other types and configurations of seal members may be readily substituted for the specific disclosed form of seal member 59.

In the preferred embodiment, the inner radius R of the deformed tire is substantially equal to the outer radius r of outer ring section surfaces 43.

Persons skilled in this art will readily appreciate that the structure of the improved roller assembly may be proportionally varied so as to alter the size and capability of the roller assembly. Of course, materials and material treating techniques may be readily modified to suit a particular application.

While the improved roller member is particularly suited for use in an upwardly-acting door structure, the utility of such roller assembly is not limited to such application or environment. For example, the improved structure could be used in a roller conveyor and the like. While the preferred embodiment is disclosed as having a metallic cup-shaped member deformed to provide a tire, such material and technique is not deemed to be critical. In lighter load applications, the tire may be formed of a suitable plastic material. The shape of the tire may be created by techniques other than roll forming. The invention does not require that the skirt be deformed into engagement with the outer ring sections. Selection of plastic as the material for the tire also provides the further advantage of a reduction in noise. If desired, the inner ring may be formed integrally with the shaft.

Therefore, while the preferred embodiment of the improved roller assembly has been shown and described, and several modifications thereof discussed, persons skilled in this art will understand that various additional changes and modifications may be made without departing from the spirit of the invention, as defined and differentiated by the following claims.

What is claimed is:

1. A roller assembly for use with an upwardly-acting door structure, comprising:

a shaft having a shoulder arranged proximate one end thereof, said end and shoulder defining therebetween a marginal end portion of said shaft;

an inner ring mounted on said shaft marginal end portion and having a surface configured to define an inner race;

an outer ring formed of a plurality of sections, said sections having cooperative surfaces configured to provide an outer race arranged to face said inner race;

a plurality of balls operatively arranged between said inner and outer races;

a cup-shaped member having a circular portion arranged in a plane substantially perpendicular to the axis of said shaft, and having a peripheral skirt portion arranged to directly embrace said outer ring sections in area contact to prevent the assembly thus formed from separating and to provide an outermost tire; and a single seal member positioned between said inner ring and one of said outer ring sections and have a surface arranged to engage said shaft.

2. A roller assembly as set forth in claim 1 wherein said inner ring is mounted fast to said shaft marginal end portion.

3. A roller assembly as set forth in claim 1 wherein said shaft shoulder is arranged to face a proximate portion of said inner ring for availability in resisting a thrust load applied in the direction facing said shoulder.

4. A roller assembly as set forth in claim 1 wherein each of said outer ring sections is case hardened.

5. A roller assembly as set forth in claim 1 wherein said member and said outer ring sections are constrained to move together.

6. A roller assembly as set forth in claim 1 wherein proximate portions of said seal member are arranged to slidably engage said inner ring, one of said outer ring sections, and said shaft.

* * * * *